(12) United States Patent
Wintrebert

(10) Patent No.: US 7,559,341 B2
(45) Date of Patent: Jul. 14, 2009

(54) FLEXIBLE TUBE PROTECTED AGAINST VIBRATIONS

(75) Inventor: Eric Wintrebert, Ressons-le-Long (FR)

(73) Assignee: Tubest Flexible Solutions (FR)

( * ) Notice: Subject to any disclaimer, the term of this patent is extended or adjusted under 35 U.S.C. 154(b) by 36 days.

(21) Appl. No.: 11/908,866

(22) PCT Filed: Nov. 30, 2005

(86) PCT No.: PCT/FR2005/002973

§ 371 (c)(1),
(2), (4) Date: Sep. 17, 2007

(87) PCT Pub. No.: WO2006/097584

PCT Pub. Date: Sep. 21, 2006

(65) Prior Publication Data

US 2008/0156388 A1   Jul. 3, 2008

(30) Foreign Application Priority Data

Mar. 17, 2005 (FR) ................................. 05 02642

(51) Int. Cl.
*F16L 11/00* (2006.01)
(52) U.S. Cl. ....................... 138/121; 138/139; 138/137; 138/125; 138/127
(58) Field of Classification Search ................. 138/121, 138/122, 137, 140, 173
See application file for complete search history.

(56) References Cited

U.S. PATENT DOCUMENTS 1,314,333 A * 8/1919 Kahn ........................ 138/121
2,146,559 A    2/1939 Berkowitz
2,449,369 A * 9/1948 Doane et al. ................. 138/121
2,757,690 A    8/1956 Young
3,232,640 A * 2/1966 Donkle, Jr. ................... 285/93
3,240,234 A    3/1966 Bond et al.
3,420,553 A * 1/1969 Poxon et al. ................... 285/49
4,344,462 A * 8/1982 Aubert et al. ............... 138/130
4,706,713 A * 11/1987 Sadamitsu et al. .......... 138/137
6,003,561 A * 12/1999 Brindza et al. .............. 138/124
6,354,332 B1 * 3/2002 Burkhardt et al. ........... 138/109

FOREIGN PATENT DOCUMENTS

DE    87 16 424    2/1988
EP    0205724    12/1986

OTHER PUBLICATIONS

International Search Report; PCT/FR2005/002973; Mar. 10, 2006.

* cited by examiner

*Primary Examiner*—Patrick F Brinson
(74) *Attorney, Agent, or Firm*—Cantor Colburn LLP

(57) ABSTRACT

The invention concerns a flexible tube (1) comprising a corrugated pipe (2) around which are mounted a pressure resistant braid (9) of tubular shape made of an adapted material as well as an outer tubular mechanical protection (13). The invention is characterized in that it comprises a tubular antifriction braid (6) arranged between the corrugated pipe and the pressure resistant braid, said antifriction braid being made of an adapted material whereof the hardness and/or the friction coefficient are lower than those of the material used for making the pressure resistant braid and at least one tubular damping layer (12) arranged between the pressure resistant braid and the outer mechanical protection.

7 Claims, 2 Drawing Sheets

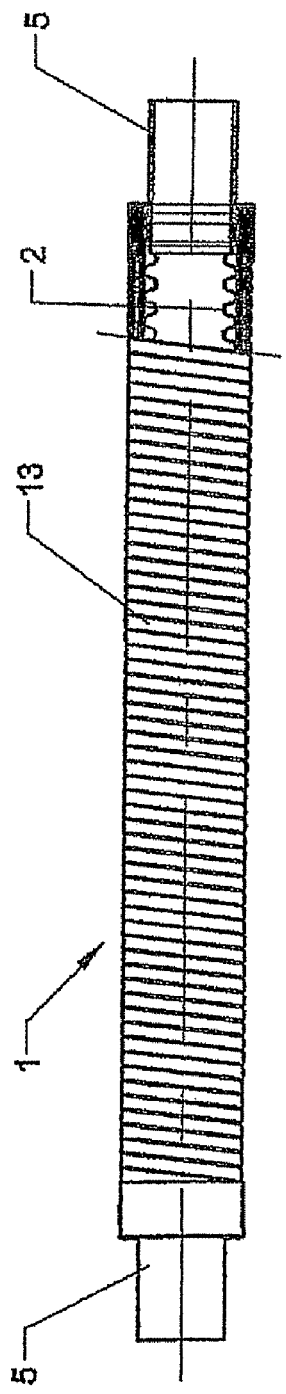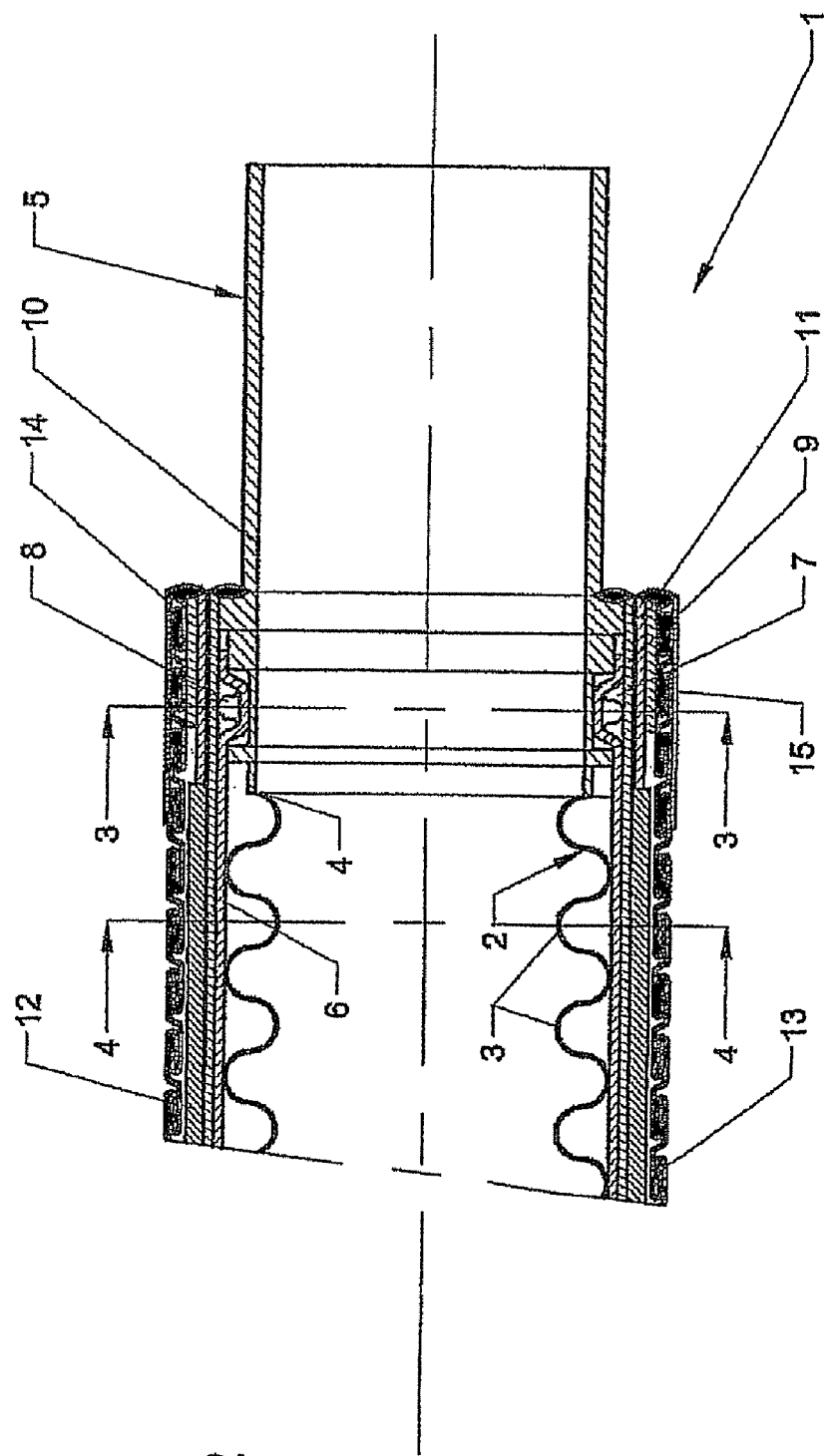

FLEXIBLE TUBE PROTECTED AGAINST VIBRATIONS

TECHNICAL FIELD OF THE INVENTION

The present invention relates to a flexible tube used in the field of industry, particularly in the field of energy for transporting hazardous or non-hazardous-fluids.

BRIEF DESCRIPTION OF RELATED ART

It is already known practice for gas turbines to be equipped with flexible tubes of this type. To do that, each flexible tube may quite simply consist of a flexible pipe inserted inside a sheath made of stainless steel.

A more elaborate flexible tube with enhanced protection against stresses exerted from the outside and liable to damage it has also been proposed. A flexible tube such as this usually consists of a corrugated pipe around which there are attached, in succession, on the one hand, one or two pressure-resistant braids of tubular shape made of stainless steel and, on the other hand, an external mechanical protection, also of tubular shape.

Nonetheless, a flexible tube such as this is very highly stressed in terms of vibration during operation and the ensuing relative displacement between the pressure-resistant braid and the corrugated pipe causes premature wear of the crests of the corrugations of the corrugated pipe. In addition, the relative displacement of the external mechanical protection with respect to the pressure-resistant braid further increases the risk of premature wear of the flexible pipe in as much as the external mechanical protection, under the effect of the vibrational stresses, is liable to damage the pressure-resistant braid, or even the corrugated pipe itself, via said pressure-resistant braid.

BRIEF SUMMARY OF THE INVENTION

The invention solves the abovementioned problem and for that reason the present invention comprises in a flexible tube intended in particular for transporting hazardous or non-hazardous fluids, this flexible tube comprising an internal corrugated pipe around which there are attached at least one pressure-resistant braid of tubular shape made of a suitable material and an external mechanical protection of tubular shape, characterized in that it comprises, on the one hand, an antifriction braid of tubular shape positioned between the corrugated pipe and the pressure-resistant braid, said antifriction braid being made of a suitable material of which the hardness and/or the coefficient of friction are lower than those of the material used to make the pressure-resistant braid and, on the other hand, at least one damping sheath positioned between the pressure-resistant braid and the external mechanical protection.

Thus, in a flexible tube according to the invention, incorporating at least one damping sheath allows the relative displacements generated within the flexible tube under the effect of the vibrational stresses to be minimized to a great extent and therefore plays a part in lengthening the life of the various components. The "damping sheath(s)/antifriction braid" coupling allows a more effective means of combating premature wear of the flexible tube, notably by protecting the crests of the corrugations of the corrugated pipe from any contact with the stainless steel pressure-resistant braid.

In a flexible tube according to the present invention, the corrugated pipe may have parallel or helical corrugations.

Advantageously, the corrugated pipe is made of a material chosen from the group formed of stainless steels and nickel-based alloys.

Advantageously also, the antifriction braid is made of material chosen from the group formed of copper-based alloys such as bronze for example, natural fibers and synthetic fibers. The natural fibers and the synthetic fibers may, for example, comprise fiberglass and of Kevlar®, respectively.

As a preference, each pressure-resistant braid is made of stainless steel.

As a preference also, each damping sheath is made of a fiberglass braid or a fiberglass knit coated with silicone, or alternatively, from some other equivalent material.

In one preferred embodiment of the invention, the external mechanical protection comprises an interlocked pipe made of stainless or some other steel.

BRIEF DESCRIPTION OF THE DRAWINGS

The invention will be better understood with the aid of the detailed description which is given hereinbelow with reference to the attached drawing in which:

FIG. 1 is, an overall view of a flexible tube according to the invention, omitting part of the external mechanical protection;

FIG. 2 is a partial view in longitudinal section at one end of the flexible tube depicted in FIG. 1;

DETAILED DESCRIPTION OF THE INVENTION

Figure 4:
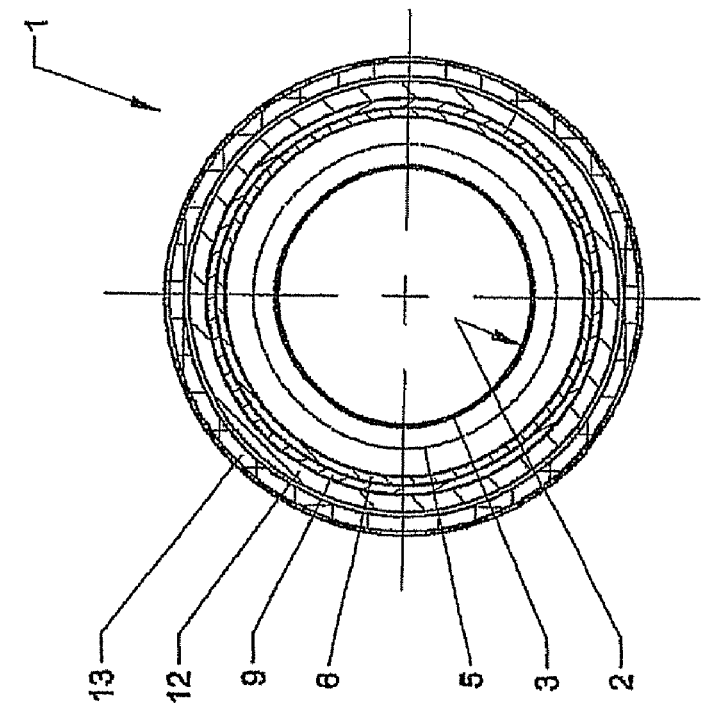
FIG. 4 is a section on 4-4 of the flexible tube depicted in FIG. 2.
Figure 3:
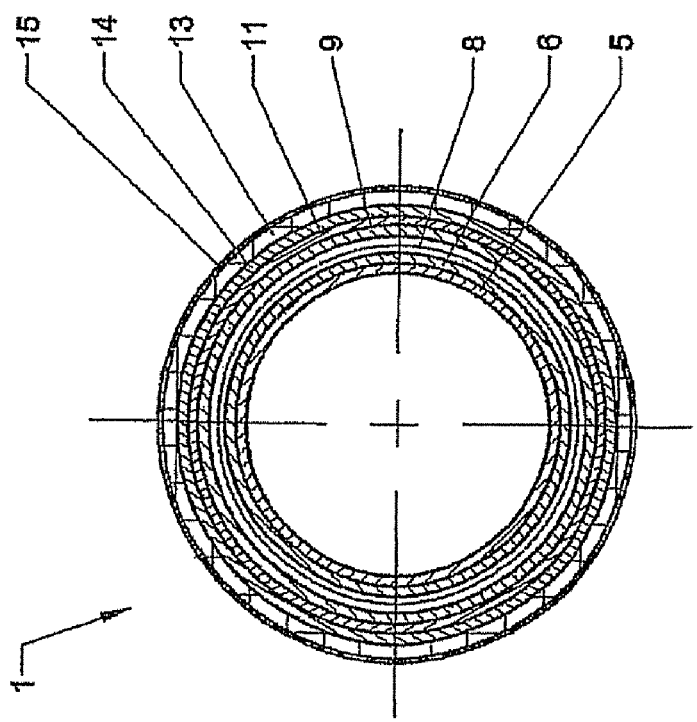
FIG. 3 is a view in section on 3-3 of the flexible tube depicted in FIG. 2.

A flexible tube 1 according to the invention, as depicted in FIGS. 1 to 4, is obtained from a corrugated pipe 2 with parallel corrugations 3 which is made of stainless steel and welded at each of its two ends 4 to a coupling 5.

An antifriction braid 6 made of bronze is then slipped along the corrugated pipe 2, this antifriction braid 6 being of tubular shape and having an internal diameter slightly larger than the largest diameter of the corrugated pipe 2, at a length substantially equal to that of said corrugated pipe 2. More specifically, each of the two ends of this antifriction braid 6 is crimped into a recess 7 exhibited by the corresponding coupling 5 and is held in this position by virtue of a clamping collar 8 housed in the recess 7.

A pressure-resistant braid 9 made of stainless steel is then slid along the antifriction braid 6. This pressure-resistant braid 9 is designed to have an internal diameter slightly larger than the external diameter of the antifriction braid 6 and a length substantially equal to that of said antifriction braid 6. A retaining ring 11 may be slipped onto each of the two ends of the pressure-resistant braid 9, said pressure-resistant braid 9 and each retaining ring 11 then possibly being welded to the external lateral face 10 of the corresponding coupling 5.

A damping sheath 12, preferably made of a silicone-coated fiberglass knit and having a thickness preferably ranging between 3 and 4 mm, is then slipped along the pressure-resistant braid 9 so as to butt against the retaining ring 11.

Finally, an external mechanical protection, produced in the form of a stainless steel interlocked pipe 13 with a compensation ring 14 at each of its two ends is slipped around the damping sheath 12. More specifically, an external retaining ring 15 is slipped over each of the two ends of the interlocked pipe 13 and the latter, together with its compensation rings 14, is finally welded, at each of its two ends, to the retaining rings 15 and to the external lateral face 10 of the couplings 5.

Thus, in a tube according to the invention, since the crests of the corrugations 3 of the corrugated pipe 2 are placed in contact with the antifriction braid 6 which is made of a material the hardness and/or coefficient of friction of which are lower than those than those of the material used to male the pressure-resistant braid 9, it then follows that the wear phenomenon is largely reduced. It is reduced still further by virtue of the damping sheath 12 which minimizes the relative displacements of the various components with respect to one another as a result of the vibrational stresses to which the flexible tube 1 is subjected. By way of example, it has been found that a flexible tube 1 according to the invention, equipped with such a "damping sheath(s)/antifriction braid" combination could have a life twenty times longer than that of a flexible pipe conventionally used.

Although the invention has been described in conjunction with some particular exemplary embodiments, it is quite clear that it is not in any way restricted thereto and that it includes all technical equivalents of the means described and combinations thereof where these fall within the scope of the invention.

The invention claimed is:

1. A flexible tube for transporting hazardous or non-hazardous fluids, comprising:
    an internal corrugated pipe around which there is attached at least one pressure-resistant braid of tubular shape made of a suitable material and an external mechanical protection of tubular shape;
    an antifriction braid of tubular shape positioned between the corrugated pipe and the pressure-resistant braid, wherein said antifriction braid is made of a suitable material of which a hardness and/or a coefficient of friction are lower than those of the material used to make the pressure-resistant braid; and
    at least one damping sheath positioned between the pressure-resistant braid and the external mechanical protection.

2. The flexible tube as claimed in claim 1, wherein the corrugated pipe has parallel or helical corrugations.

3. The flexible pipe as claimed in claim 1, wherein the corrugated pipe is made of a material comprising at least one of stainless steels and nickel-based alloys.

4. The flexible tube as claimed in of claim 1, wherein the antifriction braid is made of material comprising at least one of copper-based alloys, natural fibers and synthetic fibers.

5. The flexible tube as claimed in claim 1, wherein each pressure-resistant braid is made of stainless steel.

6. The flexible tube as claimed in claim 1, wherein each damping sheath is made of a fiberglass braid or a fiberglass knit coated with silicone.

7. The flexible tube as claimed in of claim 1, wherein the external mechanical protection comprises an interlocked piped made of stainless steel or some other material.

* * * * *